United States Patent
Son et al.

(10) Patent No.: US 11,648,850 B2
(45) Date of Patent: May 16, 2023

(54) PLUG-IN HYBRID ELECTRIC VEHICLE AND CHARGING CONTROL METHOD THEREFOR

(71) Applicants: HYUNDAI MOTOR COMPANY, Seoul (KR); KIA MOTORS CORPORATION, Seoul (KR)

(72) Inventors: Hui Un Son, Suwon-si (KR); Sung Bae Jeon, Ansan-si (KR); Jin Kyeom Cho, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 379 days.

(21) Appl. No.: 16/514,097

(22) Filed: Jul. 17, 2019

(65) Prior Publication Data

US 2020/0164764 A1 May 28, 2020

(30) Foreign Application Priority Data

Nov. 26, 2018 (KR) .......... 10-2018-0147230

(51) Int. Cl.
*B60L 58/13* (2019.01)
*B60L 50/15* (2019.01)
(Continued)

(52) U.S. Cl.
CPC .......... *B60L 58/13* (2019.02); *B60K 6/26* (2013.01); *B60K 6/28* (2013.01); *B60L 50/15* (2019.02);
(Continued)

(58) Field of Classification Search
CPC ...... B60L 53/62; B60L 2260/58; B60L 58/13; B60L 50/15; B60L 2240/60; B60L 2240/54; B60L 2240/80; B60L 2260/54; B60L 53/63; B60L 2250/14; B60L 50/61; B60L 53/64; B60L 58/12; B60W 2556/00; B60W 20/11; B60W 20/12; B60W 20/00; B60W 2556/50; B60W 2510/244; B60W 2710/244; B60W 20/10; B60W 2540/10; B60W 10/06; B60W 10/08; B60W 20/13;
(Continued)

(56) References Cited

U.S. PATENT DOCUMENTS

| 9,283,954 B2 * | 3/2016 | Dalum .................. B60W 20/12 |
| 2011/0191220 A1 * | 8/2011 | Kidston .................. B60L 58/21 705/34 |

(Continued)

*Primary Examiner* — Geepy Pe
*Assistant Examiner* — Sean Patrick Reidy
(74) *Attorney, Agent, or Firm* — Lempia Summerfield Katz LLC

(57) ABSTRACT

A plug-in hybrid electric vehicle capable of achieving a charging target in response to environmental change via a charging control method. The charging control method includes: setting reserved charging using external power based on a departure time and a target state of charge (SOC) of a battery; monitoring whether change in charging environment has occurred, determining whether the target SOC of the battery is capable of being achieved at a currently set departure time, when the charging environment has been changed; and performing series charging using an engine and a motor upon determining that the target SOC of the battery is incapable of being achieved.

7 Claims, 14 Drawing Sheets

(51) Int. Cl.
  *B60L 53/62* (2019.01)
  *B60K 6/28* (2007.10)
  *B60K 6/26* (2007.10)
  *B60W 20/00* (2016.01)

(52) U.S. Cl.
  CPC ............ *B60L 53/62* (2019.02); *B60W 20/00* (2013.01); *B60L 2240/54* (2013.01); *B60L 2240/60* (2013.01); *B60W 2510/244* (2013.01); *B60W 2556/50* (2020.02); *B60W 2710/244* (2013.01); *B60Y 2200/92* (2013.01); *B60Y 2300/91* (2013.01)

(58) Field of Classification Search
  CPC ... B60W 10/26; B60W 30/18054; B60K 6/28; B60K 6/26; B60K 6/24; B60K 6/442; B60Y 2200/92; B60Y 2300/91; Y02E 60/00; Y02T 10/7072; Y02T 10/70; Y02T 10/62; Y02T 90/169; Y02T 90/12; Y02T 90/14; Y02T 90/167; Y04S 10/126; Y04S 30/14
  USPC .......................................................... 701/22
  See application file for complete search history.

(56) References Cited

U.S. PATENT DOCUMENTS

2015/0314690 A1* 11/2015 Buia ........................ B60L 53/63
  320/157
2019/0217739 A1* 7/2019 Sinha .................... B60L 53/665

\* cited by examiner

FIG. 1 "PRIOR ART"
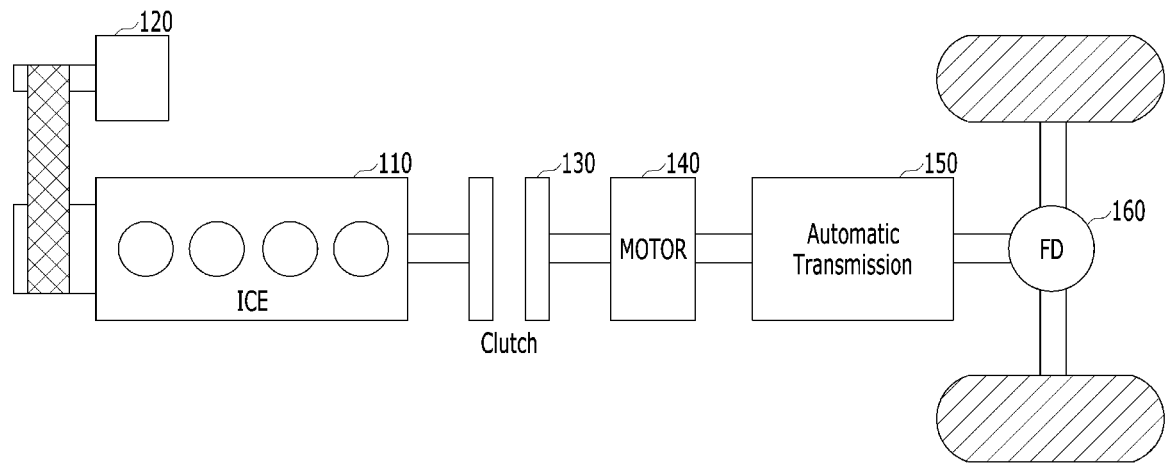
FIG. 2 "PRIOR ART"
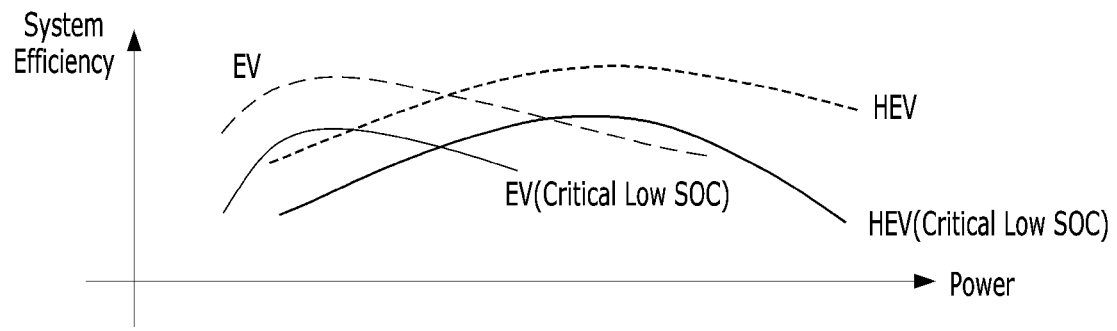

FIG. 11
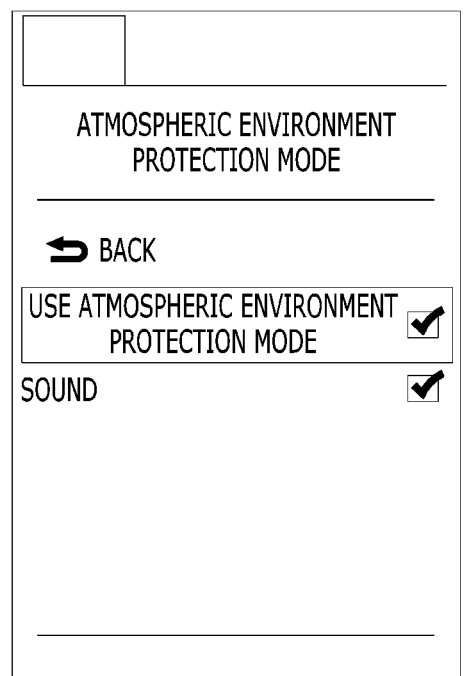
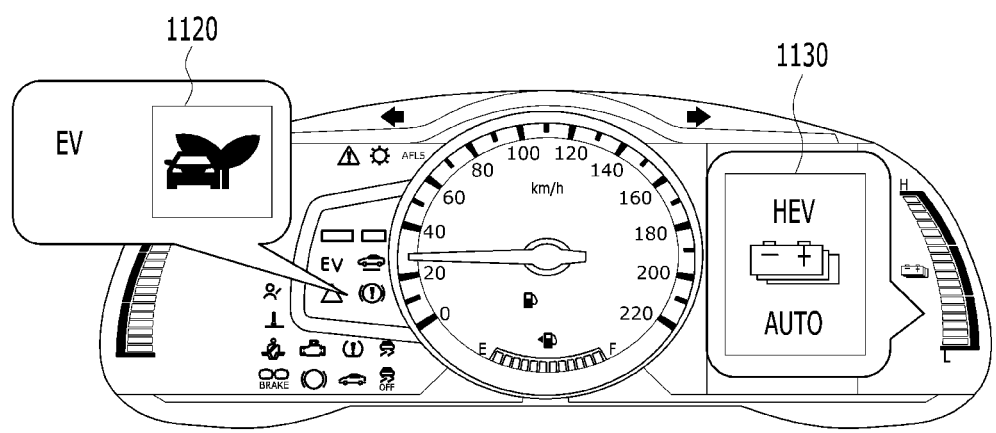

PLUG-IN HYBRID ELECTRIC VEHICLE AND CHARGING CONTROL METHOD THEREFOR

This application claims priority to and the benefit of Korean Patent Application No. 10-2018-0147230, filed on Nov. 26, 2018, the entire content of which are incorporated herein by reference.

FIELD

The present disclosure relates to a plug-in hybrid electric vehicle, and a charging control method therefor.

BACKGROUND

The statements in this section merely provide background information related to the present disclosure and may not constitute prior art.

Hybrid vehicles (hybrid electric vehicles (HEVs)) generally refer to vehicles using two power sources: an engine and an electric motor. Recently, such hybrid vehicles are being developed because the hybrid vehicles are superior to vehicles including only an internal combustion engine in terms of fuel efficiency and power performance and are also advantageous in reduction of exhaust gas.

Such a hybrid vehicle may operate in two driving modes, depending on which powertrain is driven. One of the two modes is an electric vehicle (EV) mode using an electric motor and the other thereof is an HEV mode for operating both an electric motor and an engine. The hybrid vehicle performs switching between the two modes according to driving conditions.

Switching between driving modes is generally performed for the purpose of maximizing fuel efficiency or driving efficiency according to the efficiency characteristics of the powertrain.

First, the structure of a hybrid vehicle will be described. FIG. 1 shows an example of a powertrain structure of a general parallel-type hybrid vehicle.

Referring to FIG. 1, a powertrain of a hybrid vehicle using a parallel-type hybrid system in which an electric motor (or a driving motor) 140 and an engine clutch (EC) 130 are mounted between an internal combustion engine (ICE) 110 and a transmission 150 is shown.

In such a vehicle, generally, when a driver presses an accelerator after startup, the motor 140 is first driven using power of a battery in a state in which the engine clutch 130 is open, and power of the motor is transmitted to the transmission 150 and a final drive (FD) 160, thereby moving wheels (that is, an EV mode). When larger driving force is desired as the vehicle is gradually accelerated, an auxiliary motor (or a starting power generation motor) 120 may operate to drive the engine 110.

When the rotation speeds of the engine 110 and the motor 140 become equal to each other, the engine clutch 130 is engaged and the engine 110 and the motor 140 drive the vehicle or the engine 110 drives the vehicle (that is, the EV mode transitions to the HEV mode). When a predetermined engine off condition such as vehicle deceleration is satisfied, the engine clutch 130 is open and the engine 110 is stopped (that is, the HEV mode transitions to the EV mode). In addition, in the hybrid vehicle, driving force of the wheels during braking may be converted into electric energy to charge the battery, which is referred to as braking energy regeneration or regenerative braking.

The starting power generation motor 120 serves as a starter motor when the engine is started and operates as a power generator at the time of recovery of the rotation energy of the engine after startup or at an off time. Therefore, the starting power generation motor 120 may be referred to as a hybrid starter generator (HSG) and, in some cases, may be referred to as an auxiliary motor.

The efficiency characteristics of each driving mode of the hybrid vehicle will be described with reference to FIG. 2.

FIG. 2 is a view showing the driving mode and efficiency characteristics of a general HEV.

The efficiency of the hybrid vehicle is roughly classified into two types according to the driving mode. The EV mode has high efficiency in a low load section and the HEV mode has relatively high efficiency in a high load section. However, if the state of charge of the battery is equal or less than a predetermined level (that is, critical low SOC), the output of the electric motor may not be used and thus efficiency is significantly lowered.

Specifically, if the state of charge of the battery is equal to or less than the predetermined level, the motor 140 needs to be driven through series charging using the HSG 120 in order for the vehicle to travel in the EV mode. Accordingly, efficiency is lowered due to loss of conversion efficiency as compared to the EV mode in a general situation. In addition, if the state of charge of the battery is equal to or less than the predetermined level, since it is difficult to drive the motor 140 in the HEV mode, only the engine 110 is substantially driven. In addition, since torque assist using the motor 140 is impossible, when a driving load is large, full load driving in which efficiency of the engine 110 is poor is performed and thus efficiency is rapidly lowered.

Accordingly, management of state of charge (SOC) of the battery is very important in order to provide efficient driving.

Meanwhile, a hybrid electric vehicle capable of charging a battery with external power through a plug instead of the power of an engine or regenerative braking is referred to as a plug-in hybrid electric vehicle (PHEV). The PHEV is equipped with a battery having a larger capacity than a general HEV and thus a charging time thereof is comparatively long. Accordingly, the PHEV has a reserved charging function and thus charging may automatically start from a time set by a driver. Therefore, a time zone in which the electric rates are relatively low (that is, a time zone having low rates, mainly from midnight to morning) is generally included in the charging time. In addition, in some PHEVs, when a departure time is set, a charging start time is automatically set such that charging is completed before the departure time in consideration of the current SOC and a charging schedule is determined such that a time zone having lowest electric rates is included in the charging time.

However, we have discovered that in such a reserved charging function, since a charging schedule is calculated based on the departure time set by the driver, the time zone having low electric rates and the initial charging power, when the driver changes the departure time after charging starts or when power supply of the charger becomes unstable, charging may not be completed before departure. At this time, since charging is not completed, if the vehicle travels in a series mode according to the traveling environment or if full load driving in which the efficiency of the engine is poor is performed, fuel efficiency may be lowered.

SUMMARY

The present disclosure provides a hybrid electric vehicle capable of more efficient charging through external power, and a control method thereof.

The present disclosure also provides a plug-in hybrid electric vehicle capable of achieving a target charging amount even when a charging environment is changed, and a control method thereof.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a charging control method of a plug-in hybrid vehicle includes setting reserved charging using external power according to a departure time and a target state of charge (SOC) of a battery, monitoring whether change in charging environment has occurred, determining whether the target SOC of the battery is capable of being achieved at a currently set departure time, when the charging environment has been changed, and performing series charging using an engine and a motor upon determining that the target SOC of the battery is incapable of being achieved.

In another aspect of the present disclosure, a plug-in hybrid vehicle includes a motor, an engine, and a hybrid controller unit. The hybrid controller unit monitors whether a change in a charging environment has occurred when reserved charging using external power according to a departure time and a target state of charge (SOC) of a battery is set, determines whether the target SOC of the battery is capable of being achieved at a currently set departure time when the charging environment has been changed, and performs series charging using the engine and the motor upon determining that the target SOC of the battery is incapable of being achieved.

In another aspect of the present disclosure, a charging control method of a plug-in hybrid vehicle includes: setting reserved charging using external power according to a departure time and a target state of charge (SOC) of a battery, acquiring information on a route to a destination, determining a first section, in which charging will be performed through an auxiliary motor, and a second section, in which full-load driving of an engine will be performed, based on the information on the route, determining first energy charged by an auxiliary motor in the first section and second energy to be consumed in a motor when the engine operates in the second section along an optimal operating line (OOL) with assist by the motor, and performing series charging using the motor while the reserved charging is performed based on the first energy and the second energy.

In another aspect of the present disclosure, a plug-in hybrid vehicle includes: an engine, an auxiliary motor, a motor, and a hybrid controller unit. The hybrid controller unit acquires information on a route to a destination when reserved charging using external power according to a departure time and a target state of charge (SOC) of a battery is set, determines a first section, in which charging will be performed through the auxiliary motor, and a second section, in which full-load driving of the engine will be performed, based on the information on the route, determines first energy charged by an auxiliary motor in the first section and second energy to be consumed in the motor when the engine operates in the second section along an optimal operating line (OOL) with assist by the motor, and performs series charging using the motor while the reserved charging is performed based on the first energy and the second energy.

It is to be understood that both the foregoing general description and the following detailed description of the present disclosure are exemplary and explanatory and are intended to provide further explanation of the present disclosure as claimed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view showing an example of a powertrain structure of a general parallel-type HEV;

FIG. 2 is a view showing the driving mode and efficiency characteristics of a general hybrid vehicle;

FIG. 11 is a view showing an example of reserved charging setting considering an exhaust gas emission restriction area;

Figure 3:
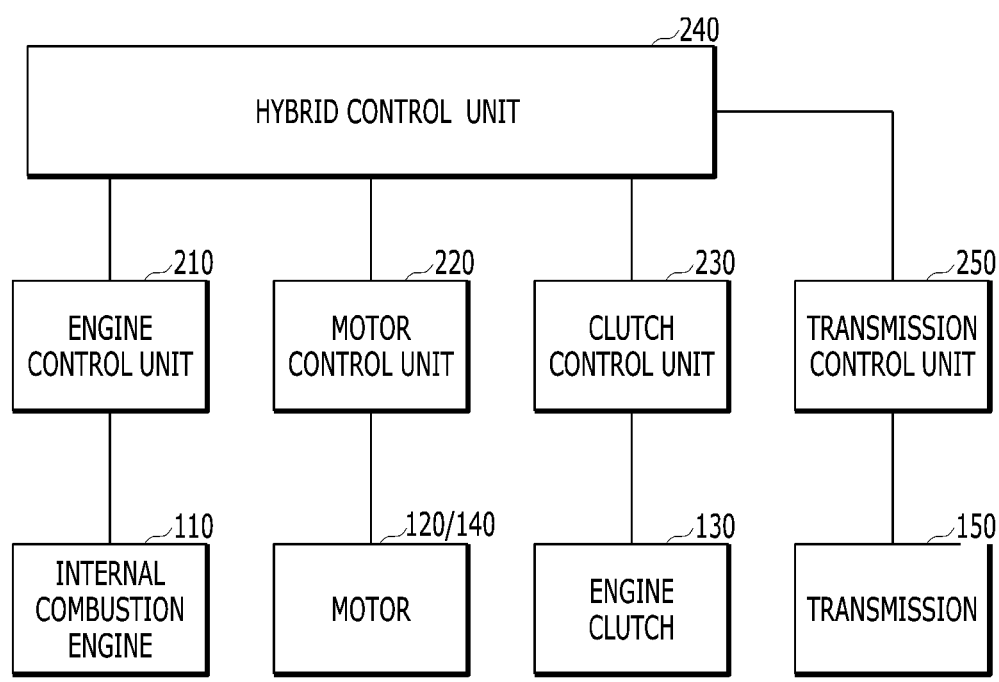
FIG. 3 is a block diagram showing an example of a control system of a hybrid vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the drawings, in order to clearly describe the present disclosure, portions which are not related to the description of the present disclosure will be omitted and similar portions are denoted by similar reference numerals throughout the specification.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware (e.g., a processor), software or a combination thereof.

Prior to description of a hybrid vehicle in which driving performance and acceleration responsiveness are improved at the time of low-speed driving and a control method thereof according to the form of the present disclosure, a control system of a hybrid vehicle applicable to the forms will be described. The basic powertrain structure of the hybrid vehicle applicable to the forms of the present disclosure is shown in FIG. 1. A relationship between control units in the vehicle, to which such a powertrain is applied, is shown in FIG. 3.

FIG. 3 is a block diagram showing an example of a control system of a hybrid vehicle, to which the forms of the present disclosure are applicable.

Referring to FIG. 3, in the hybrid vehicle, to which the forms of the present disclosure are applicable, an internal combustion engine 110 may be controlled by an engine control unit 210, torques of a starting power generation motor 120 and an electric motor 140 may be controlled by a motor control unit (MCU) 220, and an engine clutch 130 may be controlled by a clutch control unit 230. Here, the engine control unit 210 is also referred to as an engine management system (EMS). In addition, a transmission 150 is controlled by a transmission control unit 250. In some cases, a control unit of the starting power generation motor 120 and a control unit of the electric motor 140 may be separately provided.

Each control unit may be connected to a hybrid controller unit (HCU) 240 for controlling an overall mode switching process as a high-level control unit thereof to perform operation according to a control signal or provide information desired for driving mode change or engine clutch control at the time of gear shifting and/or information desired for engine stop control to the HCU 240 under control of the HCU 240.

More specifically, the HCU 240 determines whether a mode is switched according to the driving state of the vehicle. For example, the HCU determines when the engine clutch 130 is open and performs hydraulic pressure control (in the case of wet EC) or torque capacity control (in the case of dry EC) when the engine clutch is open. In addition, the HCU 240 may determine the state (lock-up, slip, open, etc.) of the engine clutch 130 and control a fuel cut time of the engine 110. In addition, the HCU may transmit a torque command for controlling the torque of the starting power generation motor 120 to the motor control unit 110 for engine stop control and may control engine rotational energy recovery. In addition, the HCU 240 may determine a mode switching condition at the time of driving mode switching control and control a low-level control unit for switching.

In addition to the functions of the HCU 240, the charging control function according to the forms of the present disclosure will be described in greater detail below with reference to FIG. 4 and figures subsequent thereto.

Of course, it will be apparent to those skilled in the art that connection relationship between the control units and the functions/division of the control units are illustrative and the names of the control units may be changed. For example, the HCU 240 may be implemented such that the functions thereof are provided by any one of the control units other than the HCU or such that the functions thereof are distributed and provided by two or more of the other control units.

It will be apparent to those skilled in the art that the configuration of FIG. 3 is merely an example of a hybrid vehicle and the structure of the hybrid vehicle applicable to the form is not limited thereto.

In one form of the present disclosure, when a departure time is changed or when it is predicted that charging is not completed before a currently set departure time due to unstable power supply of a charger, charging is completed through charging using external power and series charging using power of an engine according to settings of a driver.

First, a system configuration according to the present form will be described with reference to FIG. 4. FIG. 4 is a view showing an example of a system configuration for performing reserved charging according to one form of the present disclosure.

Figure 4:
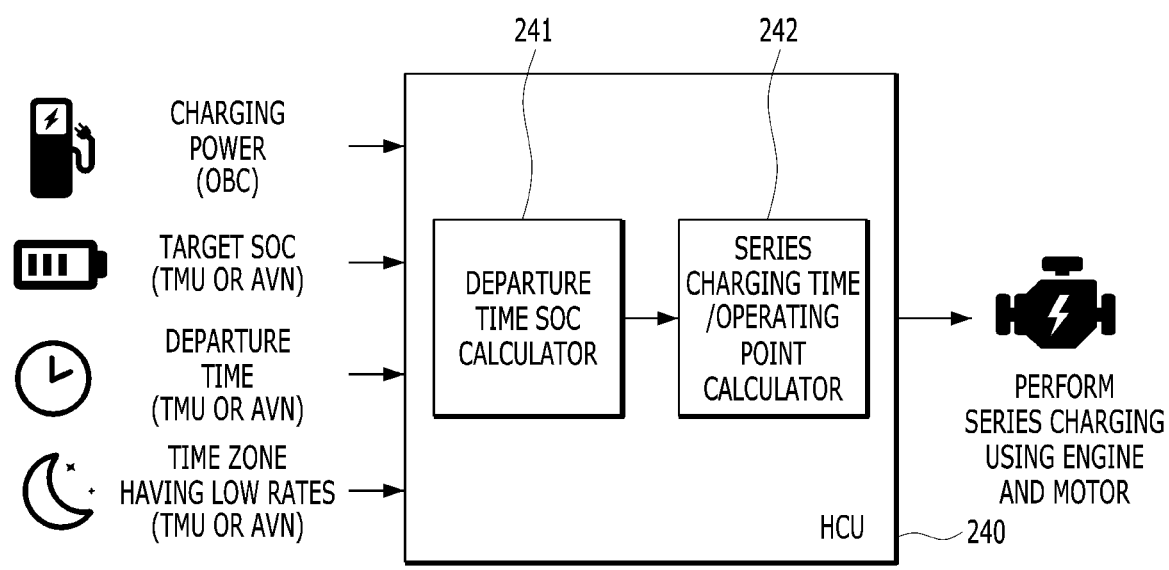
FIG. 4 is a view showing an example of a system configuration for performing reserved charging.

Referring to FIG. 4, the hybrid control unit 240 of the plug-in hybrid electric vehicle has at least one of charging power information input through a charging cable, a target SOC, a departure time and interval information of a time zone having low electric rates as input information, in order to perform a reserved charging function.

Here, the charging power information may be acquired from an on-board charger (OBC) provided in the vehicle. In addition, the remaining information may be directly input by a driver through an audio video navigation (AVN) system (or a head unit) or may be acquired by the HCU 240 by receiving a value input through an application executed on a smartphone by a telematics unit (TMU) through a telematics center.

In addition, the HCU 240 may include a departure time SOC calculator 241 and a series charging time/operating time calculator 242.

The departure time SOC calculator 241 may calculate a charging start time for enabling the SOC of the departure time to reach a target SOC in consideration of charging power information, a time remaining from a current time to the departure time and a time zone having low electric rates. At this time, the departure time SOC calculator 241 may monitor whether environmental information such as the departure time or the charging power information is changed and determine whether the target SOC can be reached at the currently set departure time when the environmental information is changed. If charging is already performed or upon determining that the target SOC cannot be reached at the currently set departure time even if the charging start time is advanced, the departure time SOC calculator 241 may notify the charging time/operating point calculator 242 of this information. In addition, the departure time SOC calculator 241 may calculate the SOC at the departure time in the current environment and transmit an insufficient charging amount for the target SOC (that is, an additionally required charging amount) to the charging time/operating point calculator 242.

The charging time/operating point calculator 242 may calculate minimum charging power for the time remaining until the departure time based on the additionally required charging amount and determine an optimal operating point in consideration of output efficiency of the engine and power generating efficiency of the motor such that series charging is performed.

A process of satisfying the target SOC through series charging when the departure time is advanced will now be described with reference to FIGS. 5 to 7, based on the system described with reference to FIG. 4.

Figure 5:
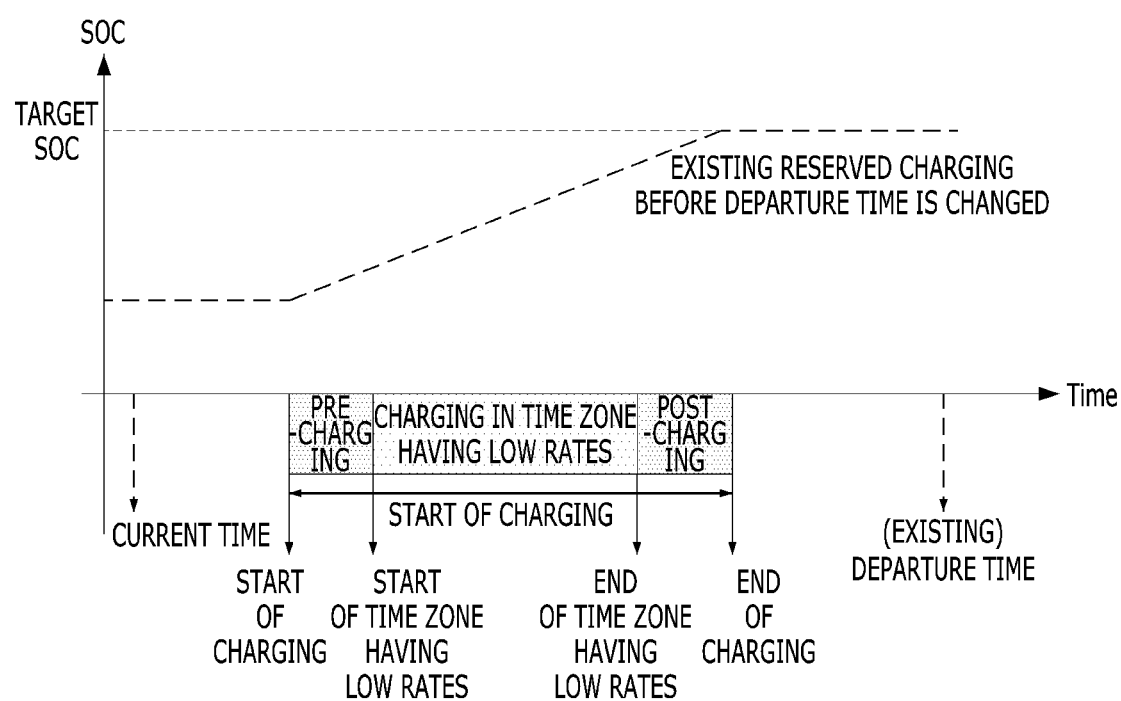
FIG. 5 is a view showing an example of a charging schedule according to an initial charging time in a hybrid vehicle.

FIG. 5 is a view showing an example of a charging schedule according to an initial charging time in a hybrid vehicle according to one form of the present disclosure.

When the driver sets a departure time and a time zone having low electric rates and selects reserved charging including low electric rates, the departure time SOC calculator 241 may set a reserved charging schedule as shown in FIG. 5, in order to satisfy the target SOC according to the state of the vehicle. However, although charging is already performed based on such a schedule, when the departure time is advanced, it may be difficult to complete charging to reach the target SOC until the changed departure time. This situation will be described with reference to FIG. 6.

Figure 6:
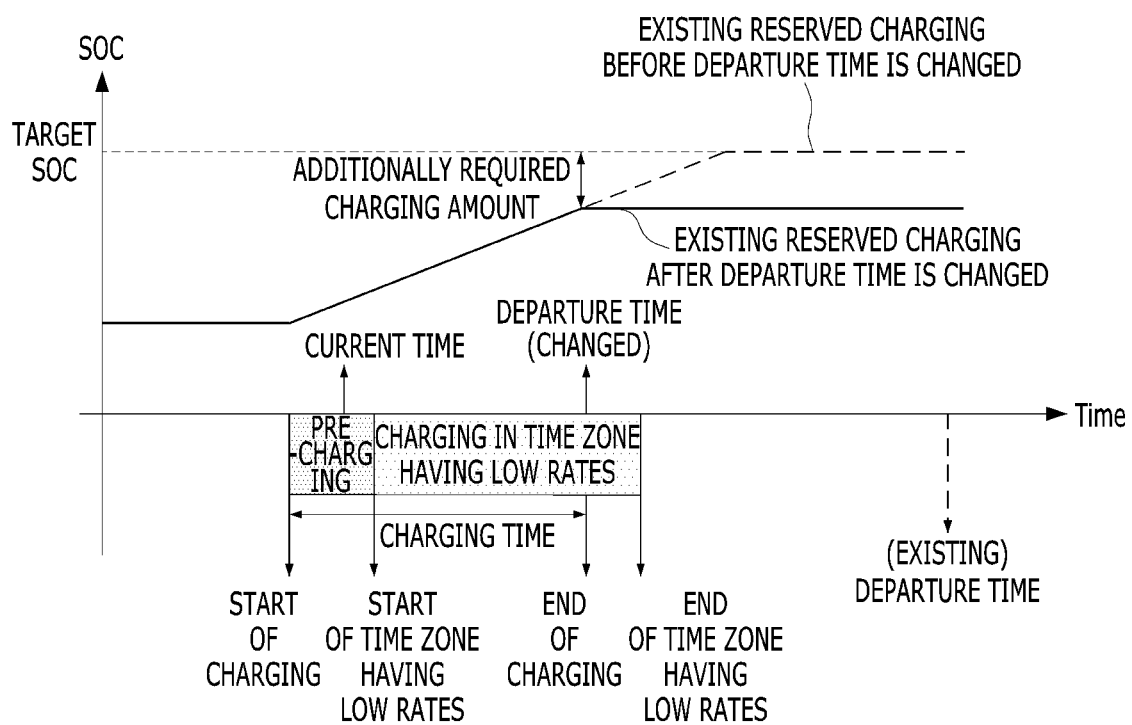
FIG. 6 is a view illustrating an additionally required charging amount according to change in departure time in a hybrid vehicle.

FIG. 6 is a view illustrating an additionally required charging amount according to change in departure time in a hybrid vehicle according to another form of the present disclosure.

As shown in FIG. 6, when a reserved charging setting such as a departure time is changed, the target SOC may not be satisfied due to the changed departure time even if charging is performed during the remaining time. Accordingly, the departure time SOC calculator 241 determines whether charging is completed until the departure time through departure time SOC re-calculation. Therefore, the departure time SOC calculator 241 may calculate the additionally required charging amount using the target SOC and the re-calculated SOC at the departure time.

The additionally required charging amount may be transmitted to the charging time/operating time calculator 242, and the charging time/operating time calculator 242 may determine the charging power of the engine series charging. This will be described with reference to FIG. 7.

Figure 7:
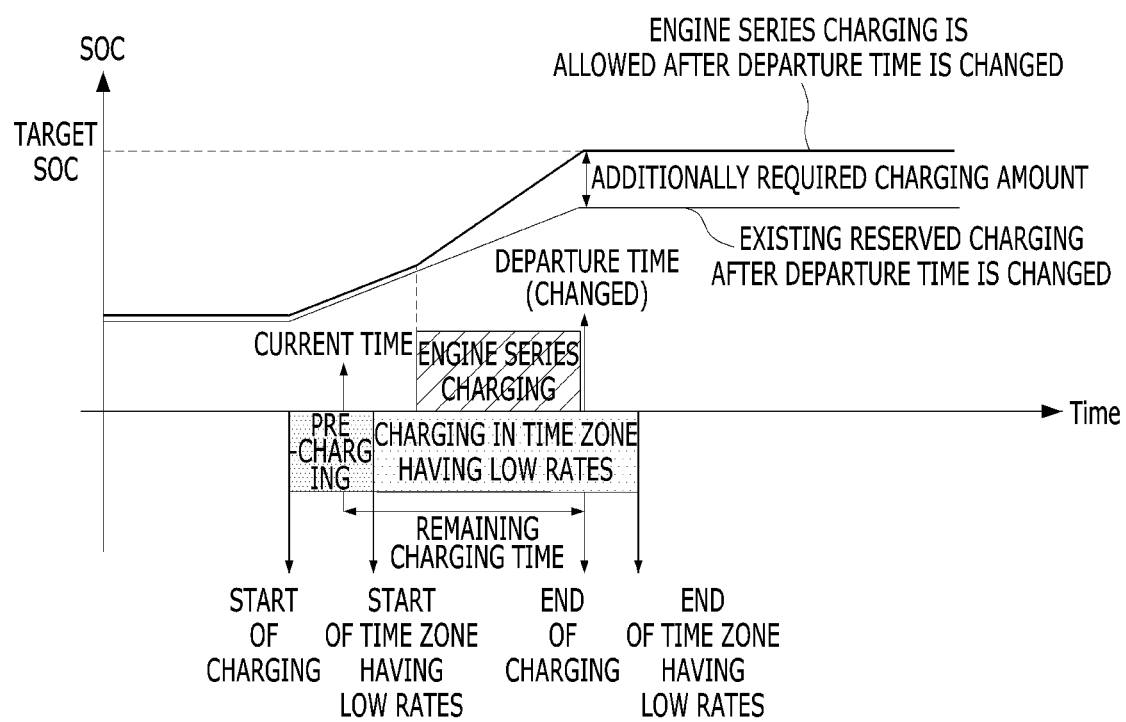
FIG. 7 is a view showing an example of a charging schedule satisfying a target SOC through series charging according to change in departure time in a hybrid vehicle.

FIG. 7 is a view showing an example of a charging schedule satisfying a target SOC through series charging according to change in departure time in a hybrid vehicle in one form of the present disclosure.

Referring to FIG. 7, in order to satisfy the target SOC at the changed departure time, charging needs to be performed by the additionally required charging amount during the remaining time, in addition to charging through the charger. Accordingly, the charging time/operating time calculator 242 may obtain minimum charging power by dividing the additionally required charging amount by the time remaining until the departure time (that is, "minimum charging power [kW]=additionally required charging amount [kWh]/remaining charging time [s]") and determines the operating points of the engine and the motor to satisfy the minimum charging power. When series charging is allowed by driver setting, engine series charging may be performed along with charging through the charger, such that the target SOC may be satisfied at the changed departure time.

Figure 8:
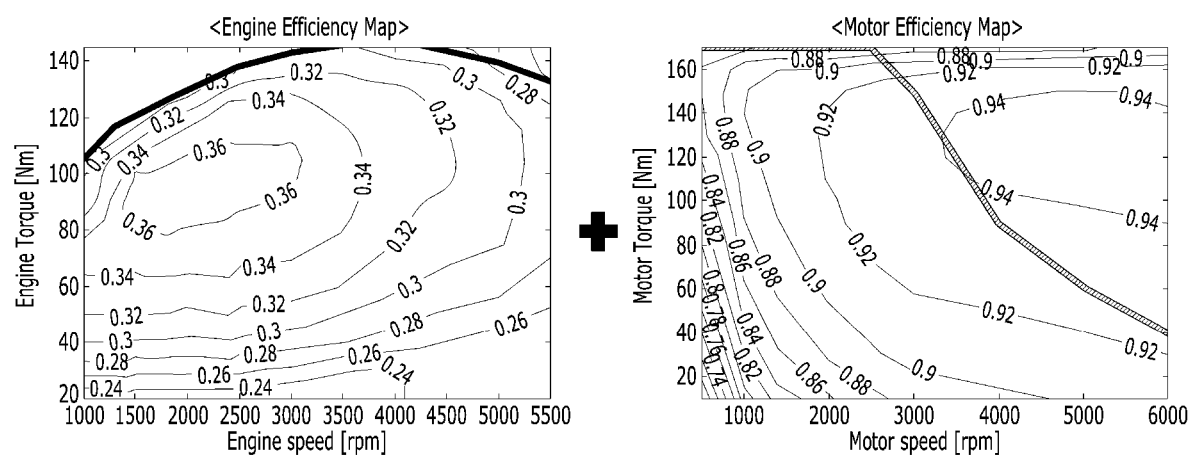
FIG. 8 is a graph showing engine efficiency and motor efficiency according to speed and torque.

Hereinafter, determination of the operating point considering efficiency of the engine and the motor at the time of series charging will be described with reference to FIGS. 8 and 9. FIG. 8 is a graph showing engine efficiency and motor efficiency according to speed and torque, and FIG. 9 is a graph illustrating determination of an optimal operating point through generating efficiency map according to one form of the present disclosure.

As described above, the charging time/operating time calculator 242 obtains initial charging power at the time of series charging and calculates charging power and charging efficiency for each operating point of the engine in consideration of the efficiency of the engine and the generating efficiency of the motor.

Figure 9:
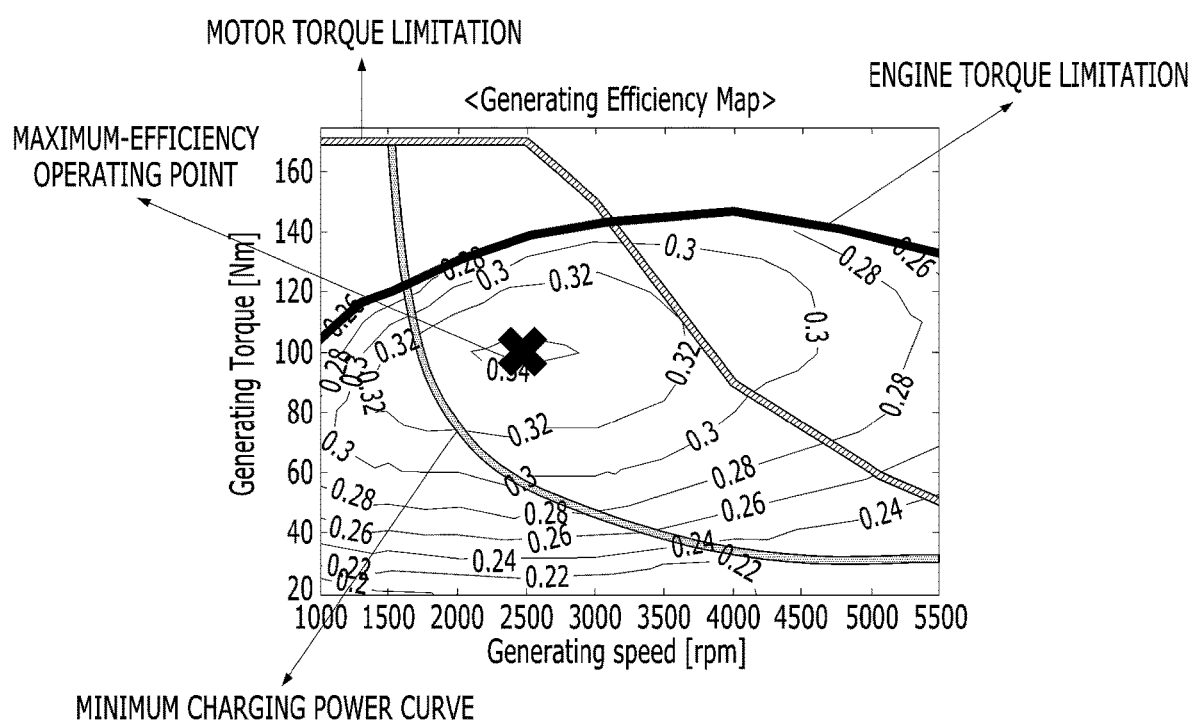
FIG. 9 is a graph illustrating determination of an optimal operating point through generating efficiency map.

At this time, when both the motor efficiency graph and the engine efficiency graph shown in FIG. 8 are applied, a generating efficiency map shown in FIG. 9 is obtained. The charging time/operating time calculator 242 may determine the optimal operating point based on such a generating efficiency map. For example, the charging time/operating time calculator 242 may determine, as a highest-efficiency operating point, an operating point having highest generating efficiency among candidate operating points which have charging power equal to or greater than the minimum charging power and do not exceed a motor torque limit and an engine torque limit, and perform series charging during the remaining time according to the determined operating point.

If there is no operating point area where minimum charging power is available due to a short remaining charging time, the charging time/operating time calculator 242 may perform charging at an operating point having highest efficiency and maximum power among the candidate operating points.

Although the case where the departure time of the charging environment is changed has been described, according to another aspect of the present disclosure, series charging is applicable even when charging power supplied to the charger becomes unstable. This will be described with respect to FIG. 10.

Figure 10:
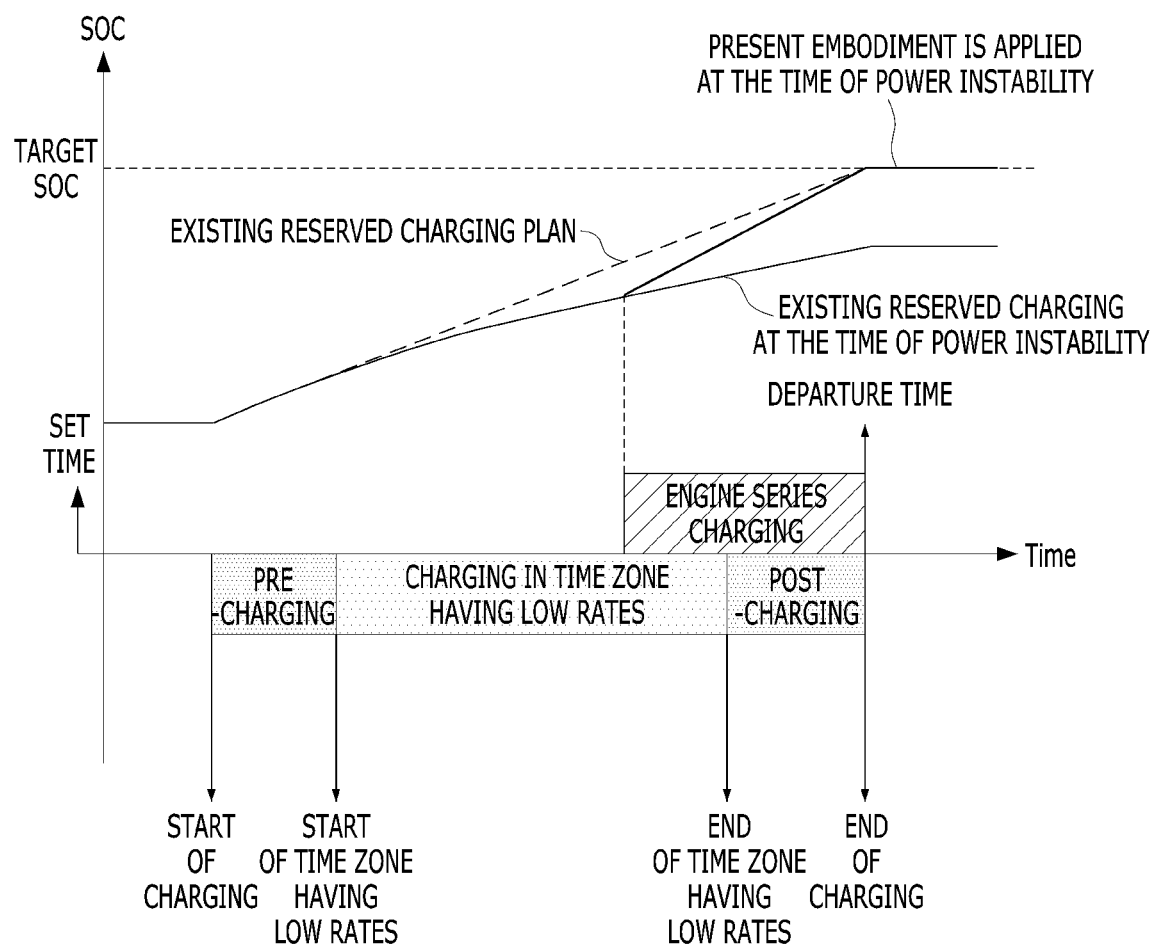
FIG. 10 is a view illustrating series charging according to charging power instability in a hybrid vehicle.

FIG. 10 is a view illustrating series charging when charging power is unstable in a hybrid vehicle according to one form of the present disclosure.

Referring to FIG. 10, when charging power is unstable, the target SOC may not be satisfied until the departure time due to change in charging power. At this time, upon determining that a difference from the target SOC exceeds a predetermined threshold value, engine series charging may be performed. At this time, unlike the case of FIGS. 5 to 7, engine series charging may be performed last in consideration of a possibility that power is recovered. Performing charging last may mean that series charging is performed as much as possible to reach maximum charging power or less and start of series charging is delayed as long as possible such that the additionally required charging amount is satisfied at the departure time.

Of course, determination of the operating point and the minimum charging power may be applied similar to the case of changing the departure time.

According to another aspect of the present disclosure, series charging is applicable even if an area where exhaust gas emission occurring by engine driving is restricted for regulations or environmental protection is included in a route. Specifically, since the vehicle travels in the EV mode in the area where exhaust gas emission is restricted, the target SOC may be set by pre-calculating the SOC to be consumed in the area. At this time, when it is difficult to reach the target SOC through charging using the charger until the departure time, series charging may be performed.

Such a function may be set as shown in FIG. 11. FIG. is a view showing an example of reserved charging setting considering an exhaust gas emission restriction area according to one form of the present disclosure. As shown in the upper side of FIG. 11, when an atmospheric environment protection mode considering the exhaust gas emission restriction area is selected through the smartphone 1110 of the driver, the target SOC and series charging may be determined in the vehicle in consideration of passage of the corresponding area. When the atmospheric environment protection mode is selected, as shown in the lower side of FIG. 11, in the vehicle, activation of the corresponding function may be displayed in a warning light area 1120 of a cluster or in a battery state display area 1130. Of course, this function may not be performed if an area where the vehicle is charged is an area where exhaust gas emission is restricted.

Figure 12:
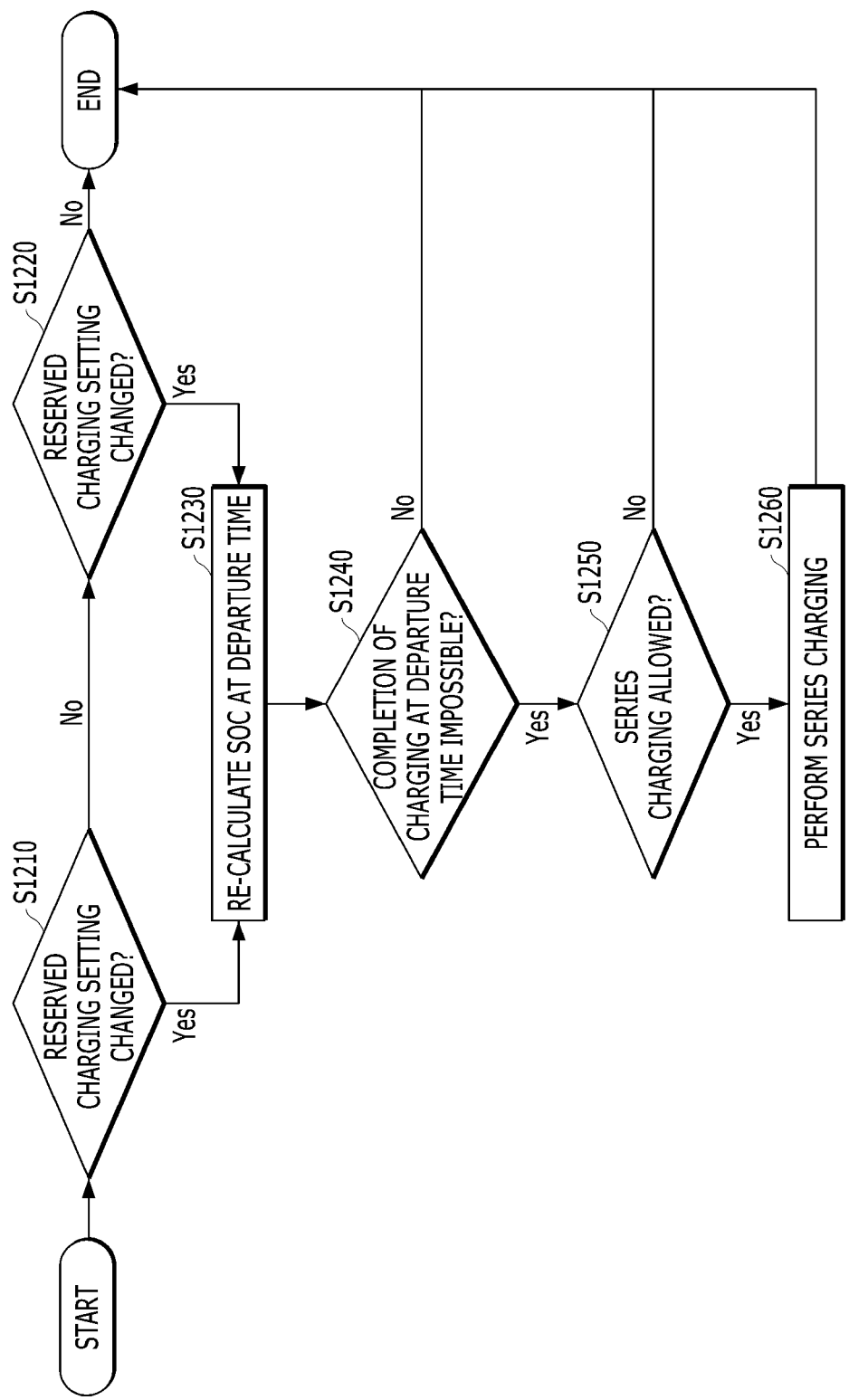
FIG. 12 is a flowchart illustrating an example of a charging control process according to change in charging environment in a hybrid vehicle.

A series charging process according to change in charging environment is summarized in the flowchart of FIG. 12.

FIG. 12 is a flowchart illustrating an example of a charging control process according to change in charging environment in a hybrid vehicle according to one form of the present disclosure.

Referring to FIG. 12, when reserved charging setting such as a departure time is changed after a reserved charging function is set (Yes of S1210) or if power supply of the charger is unstable (Yes of S1220), the HCU may calculate the SOC of the departure time based on the current charger power and the time remaining until the currently set departure time (S1230).

The HCU determines whether charging is completed at the departure time (that is, whether the target SOC is reached) based on the result of calculation (S1240) and determines whether series charging is allowed by the driver (S1250) when charging is not completed. If series charging is allowed, the HCU may check an additional charging capacity, determine the minimum charging power and the optimal operating point for charging, and perform series charging (S1260).

In the above-described forms of the present disclosure, the method of satisfying the target SOC until the departure time through series charging as desired according to change in charging environment at the time of reserved charging has been described.

Meanwhile, according to another form of the present disclosure, when the driver presets a destination and confirms a driving load of a traveling route and CD/CS driving mode transition strategy, if a high-load section or a low-load section continues in a CS section, series charging using the power of the engine may be allowed, thereby improving fuel efficiency. Here, the CD/CS mode refers to a driving mode divided based on change in SOC of the battery and means a charge depleting (CD) mode/charge sustaining (CS) mode. In general, the electric motor is driven with the power of the battery without the power of the engine, in the CD mode, and the power of the engine is used such that the SOC of the battery is not lowered, in the CS mode. The CD/CS driving mode transition strategy may be performed using a method of acquiring information on a route to the destination at the HCU and calculating a driving load of each of a plurality of sections divided based on a predetermined criterion. In the present form, the setting of the switching condition between the CD and CS modes or the method of dividing the CD section and the CS section are not limited and a description of a process of establishing the CD/CS driving mode transition strategy will be omitted.

Hereinafter, series charging according to other forms of the present disclosure will be described with reference to FIGS. 13 to 15.

Figure 13:
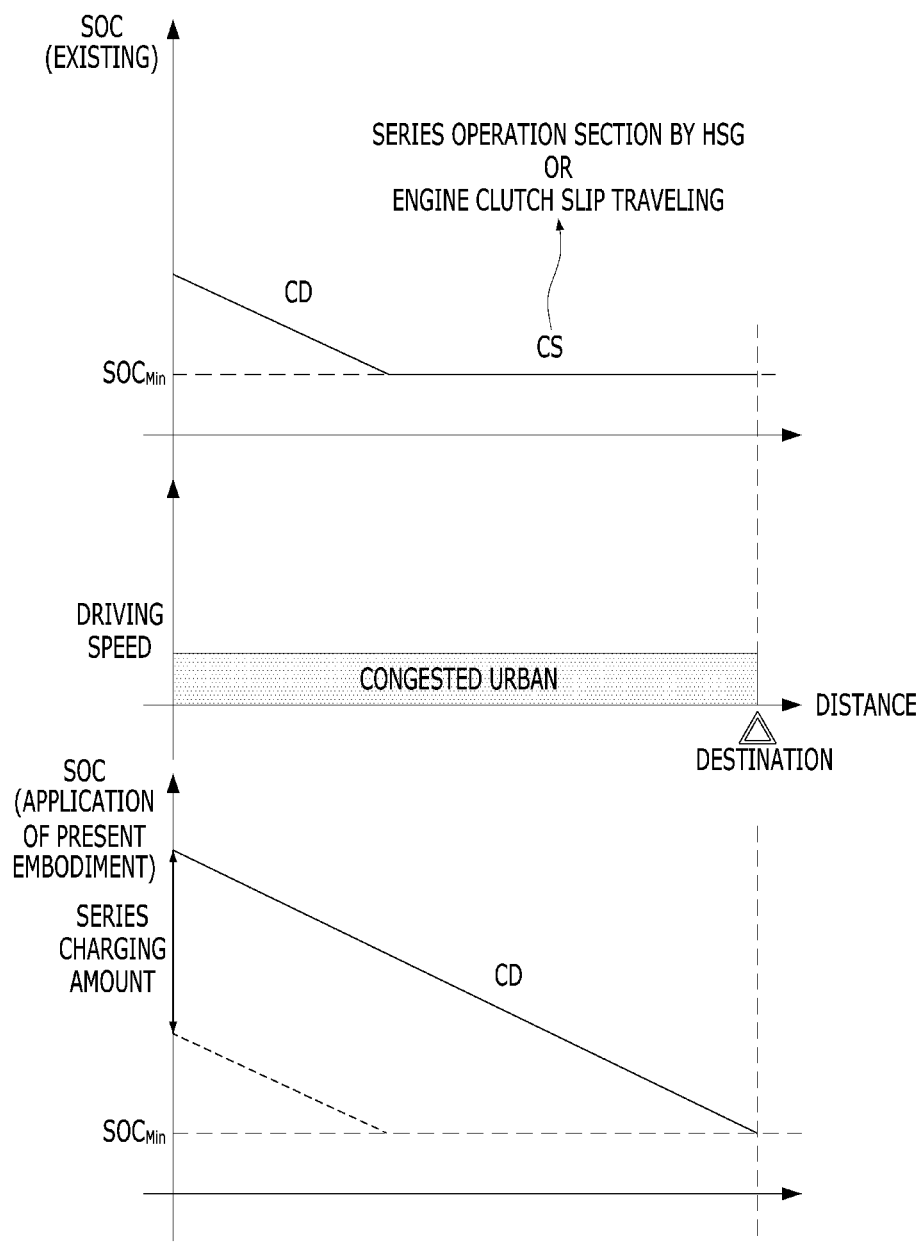
FIG. 13 is a view showing an example in which series charging is performed when a route to a destination mainly includes low-speed sections in a hybrid vehicle.

FIG. 13 is a view showing an example in which series charging is performed when a route to a destination mainly includes low-speed sections in a hybrid vehicle according to another form of the present disclosure.

FIG. 13 shows three graphs in a vertical direction, wherein the horizontal axes commonly refer to a distance from a departure point to a destination. In addition, the vertical axes indicate change in SOC according to existing reserved charging, the driving speed of the vehicle to the destination and change in SOC according to reserved charging of the present disclosure in this order from the top to bottom.

Referring to FIG. 13, low-speed sections continue from the departure point to the destination. According to the existing reserved charging (that is, the upper graph), the driver departs in a state in which charging according to a predetermined target SOC is completed.

However, when the vehicle cannot travel in the CD mode with the target SOC set by the driver in the entire low-speed section, the vehicle drives the motor with series charging through the HSG 120 or controls the engine clutch 130 in a slip state, thereby traveling in the CS mode using the power of the engine 110. In particular, if greater than maximum power of the HSG 120 is required at the time of low-speed long uphill travel, slip traveling of the clutch 130 using the engine 110 is desired to satisfy required power. At the time of clutch slip, energy transmission efficiency is lowered, adversely affecting fuel efficiency. Therefore, the lifespan of the clutch is shortened and operability is deteriorated. Accordingly, efficiency of the CS section is significantly lowered.

In order to solve such problems, as shown in the lower graph of FIG. 13, the HCU 240 may acquire route information, calculate a series charging amount through the HSG 120 in a section in which the vehicle will travel in the CS mode when the target SOC set by the driver is used, and provide the calculated charging amount through series charging using the motor 140 before departure, thereby improving fuel efficiency. This is because series charging using the motor 140 is more efficient than series charging using the HSG 120. Of course, series charging using the motor 140 may be performed at the time of stopping in addition to a charging section using external power.

Figure 14:
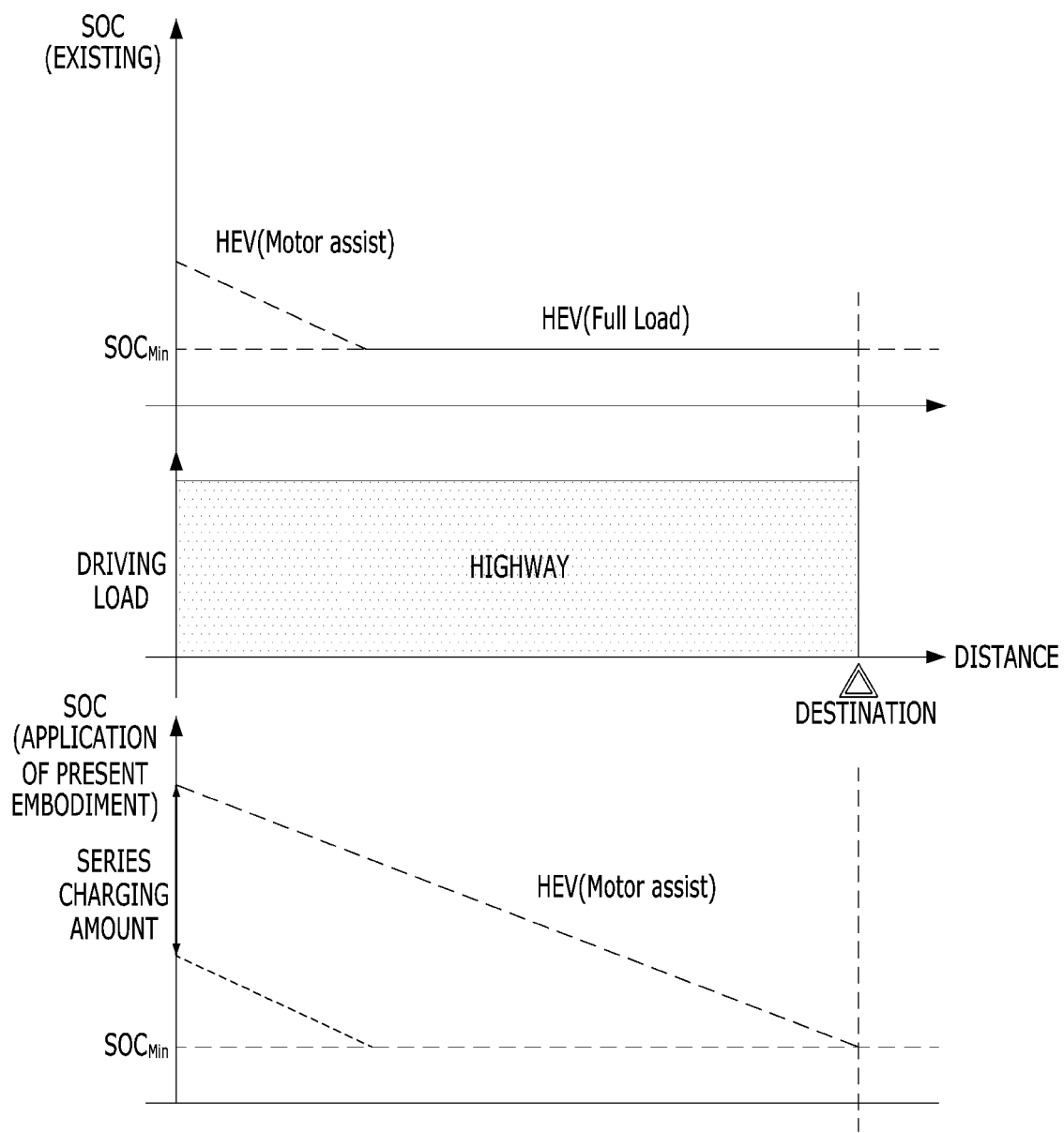
FIG. 14 is a view showing an example in which series charging is performed when a route to a destination mainly includes high-load sections in a hybrid vehicle.

FIG. 14 is a view showing an example in which series charging is performed when a route to a destination mainly includes high-load sections in a hybrid vehicle according to another form of the present disclosure.

FIG. 14 shows three graphs in a vertical direction, wherein the horizontal axes commonly refer to a distance from a departure point to a destination. In addition, the vertical axes indicate change in SOC according to existing reserved charging, the driving speed of the vehicle to the destination and change in SOC according to reserved charging of the present disclosure in this order from the top to bottom.

Referring to FIG. 14, a highway section in which required power exceeding the optimal operating line (OOL) of the engine is generated continues from the departure point to the destination and the vehicle departs in a state in which charging according to the target SOC preset by the driver is completed according to existing reserved charging (that is, the upper graph).

In this case, in the CD mode section in which SOC consumption of the battery is possible, the engine may operate in the OOL and required power may be satisfied through motor assist, in order to improve fuel efficiency. However, when the high-load section continues such that the SOC reaches a threshold value (that is, SOCmin), motor assist may not be used by switching to the CS mode. As a result, the engine operates in an inefficient full load area in order to satisfy required power, thereby lowering efficiency.

In order to solve such a problem, as shown in the lower graph of FIG. 14, the HCU 240 may acquire route information, calculate the full-load operation amount of the engine 110 in a section in which the vehicle will travel when the target SOC set by the driver is used, and secure a charging amount corresponding to the calculated operation amount through series charging using the motor before departure, thereby improving fuel efficiency. In this case, it is possible to improve exhaust performance by avoiding full-load operation of the engine 110.

Figure 15:
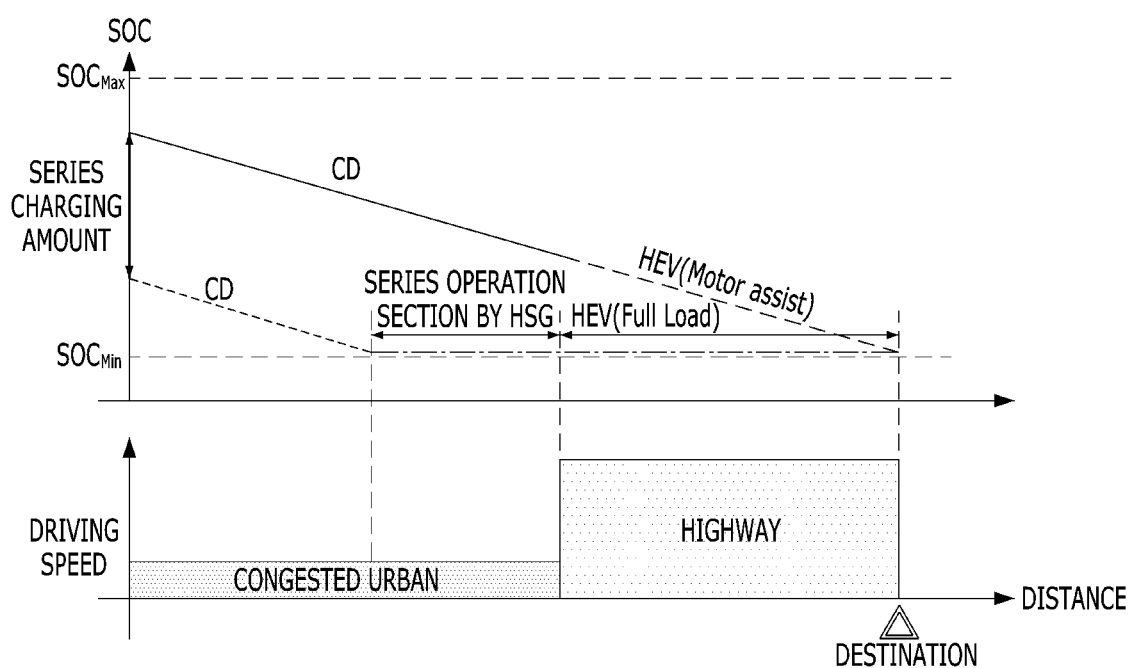
FIG. 15 is a view showing an example in which series charging is performed when low-speed sections and high-speed sections are mixed in a route to a destination in a hybrid vehicle.

FIG. 15 is a view showing an example in which series charging is performed when low-speed sections and high-speed sections are mixed in a route to a destination in a hybrid vehicle according to another form of the present disclosure.

Referring to FIG. 15, the HCU 240 may set a target SOC by adding motor assist energy and series charging energy of the HSG 120 to energy desired for traveling in the existing CD mode, such that a series operation section using the HSG 120 and a section using the full load of the engine 110 are replaced with motor operation and motor assist in advance before departure in order to improve fuel efficiency. At this time, if it is difficult to satisfy the target SOC through charging using the charger, series charging through the motor 140 may be performed in advance before the departure time. Accordingly, it is possible not only to improve fuel efficiency but also to improve exhaust performance.

In the hybrid vehicle according to at least one form of the present disclosure, it is possible to perform more efficient charging through external power.

According to the forms of the present disclosure, it is possible to achieve a target charging amount through series mode charging even when a charging environment is changed.

The present disclosure can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, optical data storage devices, and carrier waves (such as data transmission over the Internet).

The above exemplary forms are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A charging control method of a plug-in hybrid vehicle, the charging control method comprising:
   setting reserved charging using external power based on a departure time and a target state of charge (SOC) of a battery;
   monitoring whether a change in a charging environment has occurred;
   determining, when the charging environment has changed, whether the target SOC of the battery is capable of being achieved at a currently set departure time; and
   performing series charging using an engine and a motor of the plug-in hybrid vehicle upon determining that the target SOC of the battery is incapable of being achieved,
   wherein the change in the charging environment includes at least one of change in the departure time or instability of the external power, and
   wherein performing the series charging includes:
      determining an additionally required charging amount corresponding to a difference between the target SOC of the battery and the determined SOC of the battery;
      determining minimum charging power based on the additionally required charging amount and a time remaining until the currently set departure time;
      determining, as a highest-efficiency operating point, an operating point having highest generating efficiency among candidate operating points which have charging power equal to or greater than the minimum charging power and do not exceed a motor torque limit and an engine torque limit; and
      performing the series charging at the determined highest-efficiency operating point.

2. The charging control method according to claim 1, wherein determining the capability of achieving the target SOC includes:
   determining an SOC of the battery at the currently set departure time; and
   comparing the determined SOC of the battery with the target SOC of the battery.

3. The charging control method according to claim 1, wherein, when the change in charging environment is instability of the external power, the series charging is performed later such that charging is completed at the currently set departure time.

4. A non-transitory computer-readable recording medium having a program recorded thereon, the program to direct a processor to perform acts of:
   setting reserved charging using external power based on a departure time and a target state of charge (SOC) of a battery of a plug-in hybrid vehicle;
   monitoring whether a change in a charging environment has occurred;
   determining, when the charging environment has changed, whether the target SOC of the battery is capable of being achieved at a currently set departure time; and
   performing series charging using an engine and a motor of the plug-in hybrid vehicle upon determining that the target SOC of the battery is incapable of being achieved,
   wherein the change in the charging environment includes at least one of change in the departure time or instability of the external power, and
   wherein performing the series charging includes:
      determining an additionally required charging amount corresponding to a difference between the target SOC of the battery and the determined SOC of the battery;
      determining minimum charging power based on the additionally required charging amount and a time remaining until the currently set departure time;
      determining, as a highest-efficiency operating point, an operating point having highest generating efficiency among candidate operating points which have charging power equal to or greater than the minimum charging power and do not exceed a motor torque limit and an engine torque limit; and
      performing the series charging at the determined highest-efficiency operating point.

5. A plug-in hybrid vehicle, comprising:
a motor;
an engine; and
a hybrid controller unit,
wherein the hybrid controller unit is configured to:
monitor whether a change in a charging environment has occurred when reserved charging using external power is set based on a departure time and a target state of charge (SOC) of a battery,
determine whether the target SOC of the battery is capable of being achieved at a currently set departure time when the charging environment has been changed, and
perform series charging using the engine and the motor upon determining that the target SOC of the battery is incapable of being achieved,
wherein the change in charging environment includes at least one of change in the departure time or instability of the external power, and
wherein the hybrid controller unit is configured to:
   determine an additionally required charging amount corresponding to a difference between the target SOC of the battery and the determined SOC of the battery;
   determine minimum charging power based on the additionally required charging amount and a time remaining until the currently set departure time;
   determine, as a highest-efficiency operating point, an operating point having highest generating efficiency among candidate operating points which have charging power equal to or greater than the minimum charging power and do not exceed a motor torque limit and an engine torque limit; and
   perform the series charging at the determined highest-efficiency operating point.

6. The plug-in hybrid vehicle according to claim 5, wherein the hybrid controller unit is configured to determine an SOC of the battery at the currently set departure time and compare the determined SOC of the battery with the target SOC of the battery.

7. The plug-in hybrid vehicle according to claim 5, wherein, when the change in charging environment is instability of the external power, the hybrid controller unit is configured to perform the series charging later such that charging is completed at the currently set departure time.

\* \* \* \* \*